United States Patent
Jeppsson (10) Patent No.: US 10,609,539 B2
(45) Date of Patent: Mar. 31, 2020

(54) INCREASING PROBABILITY OF SYSTEM INFORMATION RECEPTION IN DEVICE

(71) Applicant: Telefonaktiebolaget LM Ericsson (publ), Stockholm (SE)

(72) Inventor: Henrik Jeppsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 16 days.

(21) Appl. No.: 15/754,498

(22) PCT Filed: Aug. 27, 2015

(86) PCT No.: PCT/EP2015/069646
§ 371 (c)(1),
(2) Date: Feb. 22, 2018

(87) PCT Pub. No.: WO2017/032421
PCT Pub. Date: Mar. 2, 2017

(65) Prior Publication Data
US 2018/0262895 A1    Sep. 13, 2018

(51) Int. Cl.
*H04W 4/90* (2018.01)
*H04W 48/10* (2009.01)
(Continued)

(52) U.S. Cl.
CPC .............. *H04W 4/90* (2018.02); *H04L 1/08* (2013.01); *H04W 48/10* (2013.01); *H04W 68/005* (2013.01)

(58) Field of Classification Search
CPC ................................ H04W 48/10; H04W 4/90
(Continued)

(56) References Cited

U.S. PATENT DOCUMENTS

| 2009/0233634 A1 | 9/2009 | Aghili et al. |
| 2011/0034165 A1 | 2/2011 | Hsu et al. |

(Continued)

FOREIGN PATENT DOCUMENTS

| WO | 2009155306 A1 | 12/2009 |
| WO | 2014180372 A1 | 11/2014 |
| WO | 2015018345 A1 | 2/2015 |

OTHER PUBLICATIONS

3GPP, "3GPP TR 22.968 V12.0.0 (Oct. 2014)", 3rd Generation Partnership Project; Technical Specification Group Services and System Aspects; Study for requirements for a Public Warning System (PWS) service (Release 12), Oct. 2014, pp. 1-34.
(Continued)

*Primary Examiner* — John J Lee
(74) *Attorney, Agent, or Firm* — Murphy, Bilak & Homiller, PLLC (57) ABSTRACT

The present disclosure relates to a network device and methods for broadcasting a system information message that is associated with a time window. More particularly the disclosure pertains to ensuring reception of a SI message in a UE. In particular, the disclosure relates to a method, performed in a network node, for broadcasting a system information message that is associated with a time window 34. The method comprises detecting S1 that the system information, SI, message is of a predetermined message type, transmitting S2 the system information message in a first subframe 35a of the associated time window, and transmitting S3 the system information message in at least one second subframe 35b of the associated time window, in response to the detection that the system information message is of a predetermined message type.

18 Claims, 5 Drawing Sheets

(51) Int. Cl.
*H04L 1/08* (2006.01)
*H04W 68/00* (2009.01)

(58) Field of Classification Search
USPC ... 455/3.01, 67.11, 422.1, 412.2, 452.1, 509, 455/455
See application file for complete search history.

(56) References Cited

U.S. PATENT DOCUMENTS

| | | | |
|---|---|---|---|
| 2011/0059718 A1* | 3/2011 | Wang | H04W 4/90 455/404.1 |
| 2014/0112180 A1 | 4/2014 | Axmon et al. | |
| 2014/0119310 A1 | 5/2014 | Shimizu et al. | |
| 2014/0219180 A1 | 8/2014 | Ofuji et al. | |
| 2014/0341059 A1* | 11/2014 | Jang | H04W 48/06 370/252 |
| 2016/0234837 A1* | 8/2016 | Fang | H04W 48/08 |

OTHER PUBLICATIONS

3GPP, "3GPP TS 22.268 V12.2.0 (Jun. 2013)", 3rd Generation Partnership Project; Technical Specification Group Services and System Aspects; Public Warning System (PWS) requirements (Release 12), Jun. 2013, pp. 1-16.
3GPP, "3GPP TS 36.331 V12.3.0 (Sep. 2014)", 3rd Generation Partnership Project; Technical Specification Group Radio Access Network; Evolved Universal Terrestrial Radio Access (E-UTRA); Radio Resource Control (RRC); Protocol specification (Release 12), Sep. 2014, pp. 1-378.
Nokia Corporation, "System Information Segmentation", 3GPP TSG-RAN WG2 Meeting #63, R2-084496, Jeju, Korea, Jul. 18-22, 2008, pp. 1-4.

* cited by examiner

INCREASING PROBABILITY OF SYSTEM INFORMATION RECEPTION IN DEVICE

TECHNICAL FIELD

The present disclosure relates to a network node and methods for broadcasting a system information message that is associated with a time window. In particular the disclosure relates to broadcasting system information messages having high priority.

BACKGROUND

The 3rd Generation Partnership Project, 3GPP, is responsible for the standardization of the Universal Mobile Telecommunication System, UMTS, and Long Term Evolution, LTE. The 3GPP work on LTE is also referred to as Evolved Universal Terrestrial Access Network, E-UTRAN. LTE is a technology for realizing high-speed packet-based communication that can reach high data rates both in the downlink and in the uplink, and is thought of as a next generation mobile communication system relative to UMTS. In order to support high data rates, LTE allows for a system bandwidth of 20 MHz, or up to 100 MHz when carrier aggregation is employed. LTE is also able to operate in different frequency bands and can operate in at least Frequency Division Duplex, FDD and Time Division Duplex, TDD, modes.

The 3GPP began in 2006 to define the requirements of a Public Warning System, PWS. An effective Public Warning System is an essential part of an effective early warning system and can substantially reduce deaths and damage from certain disasters by giving the population time to flee for example a tsunami, flood or severe storm, to prepare for an earthquake and to enable them to protect their property wherever possible. The technical specification for PWS gives general criteria for the delivery of alerts, the content of messages and user equipment features of PWS-capable user equipment, UE. There are regional systems of PWS; for example the Earthquake and Tsunami Warning System (ETWS) in Japan and Commercial Mobile Alert System (CMAS) in the USA. The technical specification also includes the requirements of these regional systems.

The 3GPP standards for PWS are 3GPP TR 22.968 Rel-12 SP-2014-09-17 "Study for Requirements for Public Warning system (PWS) Service" and 3GPP TS 22.268 Rel-12 SP-65 2014-09-17 "Public Warning System (PWS) Requirements". The alerting technology to be used is not specified but Cell Broadcast Service is the generally used technology for PWS.

It is essential that as many user equipment as possible receive these PWS messages. Hence, there is a need for techniques for further enhancing reliability of reception of PWS messages.

SUMMARY

An object of the present disclosure is to provide methods and network nodes which seek to mitigate, alleviate, or eliminate one or more of the above-identified deficiencies in the art and disadvantages singly or in any combination.

This object is obtained by a method, performed in a network node, for broadcasting a system information message that is associated with a time window. The method comprises detecting that the system information, SI, message is of a predetermined message type, transmitting the system information message in a first subframe of the associated time window, and transmitting the system information message in at least one second subframe of the associated time window, in response to the detection that the system information message is of a predetermined message type.

By performing this method, the success rate for device reception of System Information is increased. The proposed method will increase the probability for the UE to receive essential broadcast information via System Information. Essential broadcast information includes for example PWS information. Specifically, the method will maximize the probability for PWS SIBs to be received in the UE, without re-scheduling and without affecting measurements gaps, by duplicating e.g. PWS SIB10/11/12 in two or more subframes within the same SI Window (time window where devices/UE read system information).

According to some aspects, the time window is a radio frame or System Information, SI, time window. In other words, the system information message will be sent at least two times within the same radio frame or SI time window to make sure that at least one of the messages does not coincide with a measurement gap.

According to some aspects, the method comprises the step of configuring the time window by another system information message. In other words, the time window has been configured by a previously transmitted system information message. Thus the time window has been previously determined.

According to some aspects, the predetermined message type is a Public Warning System Message. Thereby, the risk of a PWS message not reaching a UE is minimized.

According to some aspects, a time delay between the first subframe and the second subframe at least equals the time of a UE measurement gap. This makes sure the first subframe and the second subframe do not both coincide with the measurement gap. In other words, it is ensured that at least one of the first and the second subframe is received at the UE when there is no measurement gap.

According to some aspects, the time delay is at least 6 ms. 6 ms being the length of the measurement gap.

According to some aspects, when the first subframe is the first subframe of a LTE radio frame or a SI window, then the second subframe is the last subframe of a LTE radio frame or a SI window. It is thus ensured that the measurement gap does not coincide with both the first and the second subframe since the length of the measurement gap is 6 ms.

According to some aspects, when the first subframe is the first subframe of a LTE radio frame or a SI window, then the second subframe is the 7th subframe of a LTE radio frame or a SI window. 5 subframes is the minimum number of subframes that need to separate the first and the second subframe to ensure that at least one of the subframes is received at the UE.

According to some aspects, the first subframe is any subframe of a LTE radio frame or a SI window and wherein the SI message is transmitted in a second subframe at least 6 ms later. It is possible to place the first subframe and the second subframe anywhere in the LTE radio frame or SI window as long as the second subframe is at least 6 ms later, taken from the start of the first subframe.

According to some aspects, the disclosure relates to computer program code which, when executed, causes a radio network node to execute the method according to above and with the same advantages as previously discussed when discussing the method.

According to some aspects, the disclosure relates to a network node, in a communication system, the network node being configured for detecting several messages of a preconfigured message type and for broadcasting a system information message that is associated with a time window. The network node comprises a radio communication interface, a network communication interface configured for communication with other network nodes, and processing circuitry. The processing circuitry is configured to cause the network node to detect that the system information, SI, message is of a predetermined message type, to transmit the system information message in a first subframe of the associated time window, and to transmit the system information message in at least one second subframe of the associated time window, in response to the detection that the system information message is of a predetermined message type. The advantages with the network node are discussed above when discussing the advantages of the method, since they are corresponding.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Aspects of the present disclosure will be described more fully hereinafter with reference to the accompanying drawings. The network node and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.
System Information In an LTE system, System Information (SI) is broadcasted by the eNodeBs in the corresponding cell areas. The SI comprises a static part called MIB (Master Information Block) and a dynamic part called SIBs (System Information Blocks). The SIBs are mapped onto RRC System Information messages on the DL-SCH (Downlink Shared Channel), which in turn is carried by PDSCH (Physical Downlink Shared Channel).

SIBs carry relevant information for the UE, which helps the UE to access a cell, perform cell re-selection, information related to INTRA-frequency, INTER-frequency and INTER-RAT cell selections. Currently, in LTE there are several types of SIBs defined for a variety of purposes.

SIB1 uses a fixed schedule with a periodicity of 80 ms. The first transmission of SIB1 is scheduled in subframe #5 of radio frames for which the SFN mod 8=0, and repetitions are scheduled in subframe #5 of all other radio frames for which SFN mod 2=0.

Scheduling of other SIB's i.e. SIB-2 to SIB-9 is defined by SI-Periodicity and SI-WindowLength. SI-WindowLength tells that a SIB should be transmitted somewhere within the window length starting at the SFN specified by SI-Periodicity. This window is also referred to as the SI time window. For the rest of the SIBs, paging is received by UE in RRC_IDLE or RRC CONNECTED mode for notification of an in-coming SI message.

If the UE receives a paging message including a PWS indication, then it starts receiving PWS notifications according to scheduling contained in SIB1. SIB10-12 contains public warning messages, for example earthquake information.
Neighbor Cell Measurements In LTE neighbor cell measurements are performed by the UEs for mobility. Therefore, measurement gaps are needed by the UE (having a single RF) to monitor cells on other frequencies than the serving cell, i.e. LTE inter-frequency as well as inter-RAT (e.g. GSM and 3G) cells. Measurement Gaps are periods where UE switches off its Rx and TX from the serving Cell and starts listening to other cells. This GAP period has to be in sync with the eNB because the eNB should know when the UE will enter the GAP state. The measurement GAPs are typically scheduled by E-UTRAN.

In LTE, there is a problem in existing solutions; an uncoordinated network broadcast of system information, SI, broadcast and a scheduled measurement gap in a user equipment, UE, can coincide. The occurrence can result in a collision of a SI/SIB (System Information Block) transmit and a scheduled UE measurement gap which can result in loss of UE SI/SIB receptions. The loss will be critical in cases where PWS SIBs are transmitted and not received by the UE; for example during broadcast of earthquake warning messages.

Figure 1:
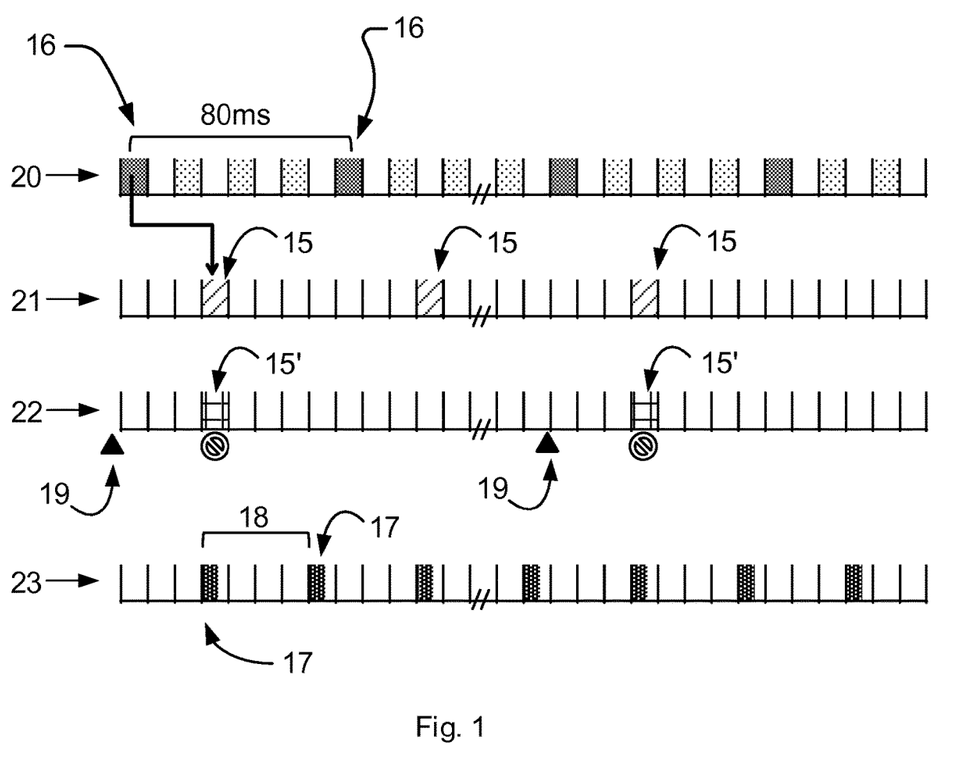
FIG. 1 illustrates the problem with existing solutions where the PWS message is lost due to it coinciding with a measurement gap.

An example of the problem is illustrated in FIG. 1. The first line 20 of FIG. 1 illustrates the timing of a SIB1 message 16 that is broadcasted by an eNB. The periodicity of the SIB 1 transmissions is 80 ms. The second line 21 of FIG. 1 illustrates SIB10 messages 15 transmitted by the eNodeB and scheduled by SIB1.

However, it might happen that the UE is occupied with neighbor cell measurements, when the SIB 10 is scheduled. The UE can therefore be prevented from receiving SIB10 that are colliding with the measurement gaps, because in the measurement gaps the radio of the UE is tuned to another frequency. The reason is that in some cases coordination of SIB scheduling and measurement gap scheduling can't be achieved, due to unforeseen circumstances, such as timing and re-scheduling of new measurement gaps.

Those "lost" SIB10 15' are indicated on line 22 of FIG. 1. In this illustration the interval between the paging (paging interval) is 1280 ms, 19, and in this example, the periodicity of the SIB10 is 80 ms. The lower line 23 of FIG. 1 shows a worst case scenario with a measurement gap pattern with 6 ms measurement gap duration 17 and 40 ms periodicity 18. As can be seen, the full content of SIB10 15' cannot be read by the UE due to scheduled measurement gaps.

Hence, SI/SIB and measurement gap scheduling have the same multiples of periodicity; 40 and 80 ms. Loss of UE SI/SIB receptions are in the range of 15% in worst case; 6 out of 40 system frames can be lost.

Rescheduling of measurement gap per device and changing measurement gap offset, in order to avoid the overlap, needs to be executed per device. Such a solution is time consuming and demands a great amount of radio signaling to each device. Rescheduling will also delay the broadcast of system information messages.

Figure 2:
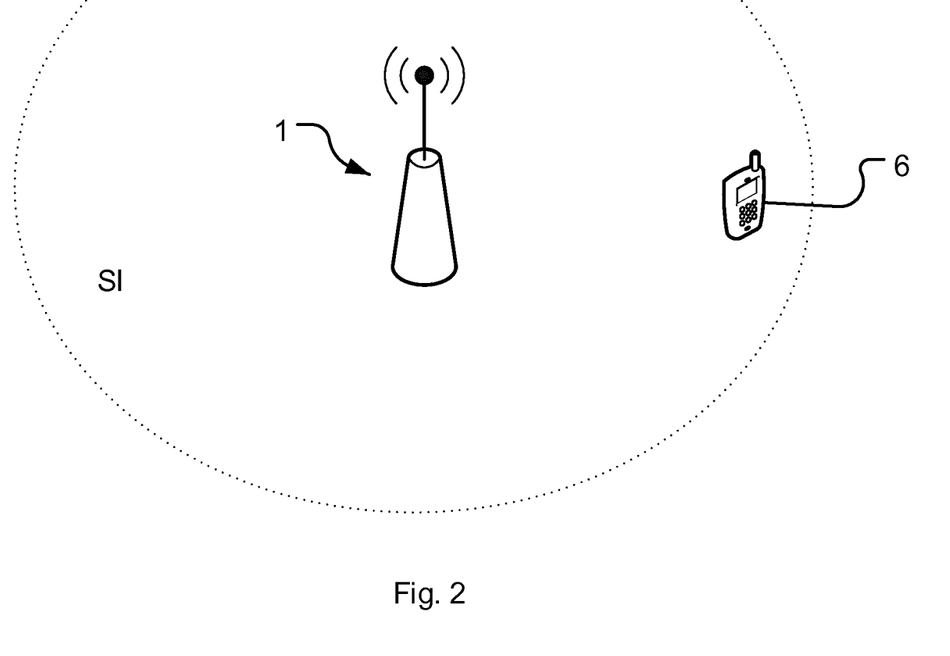
FIG. 2 illustrates a network node broadcasting System Information which is received at a User Equipment within the transmission range of the network node.

FIG. 2 illustrates an example of a scenario where a network node is broadcasting a System Information, SI, messages. The network node 1 broadcasts SI information such as e.g. PWS messages warning about a potential danger and all User Equipments, UEs, 6 within range are potential receivers of the messages.

SI Message Duplication

The basic concept of the disclosure is that the network node transmitting an SI message duplicates the blocks, or in other words SIBs, of the SI message that contains information that it is crucial that it is received at the UE, such as PWS information. The duplicated parts are transmitted at least at two positions in the subframes according to a predetermined pattern. This is so that it is ensured that at least one of the crucial parts does not coincide with a measurement gap at the receiving UE and thus the message guaranteed to be received. In the following description, details of the concept are thoroughly described and explained.

An example of transmitting the system information message in a first subframe and in a second subframe of a system frame of an LTE system will now be described referring to FIG. 3.

Figure 3:
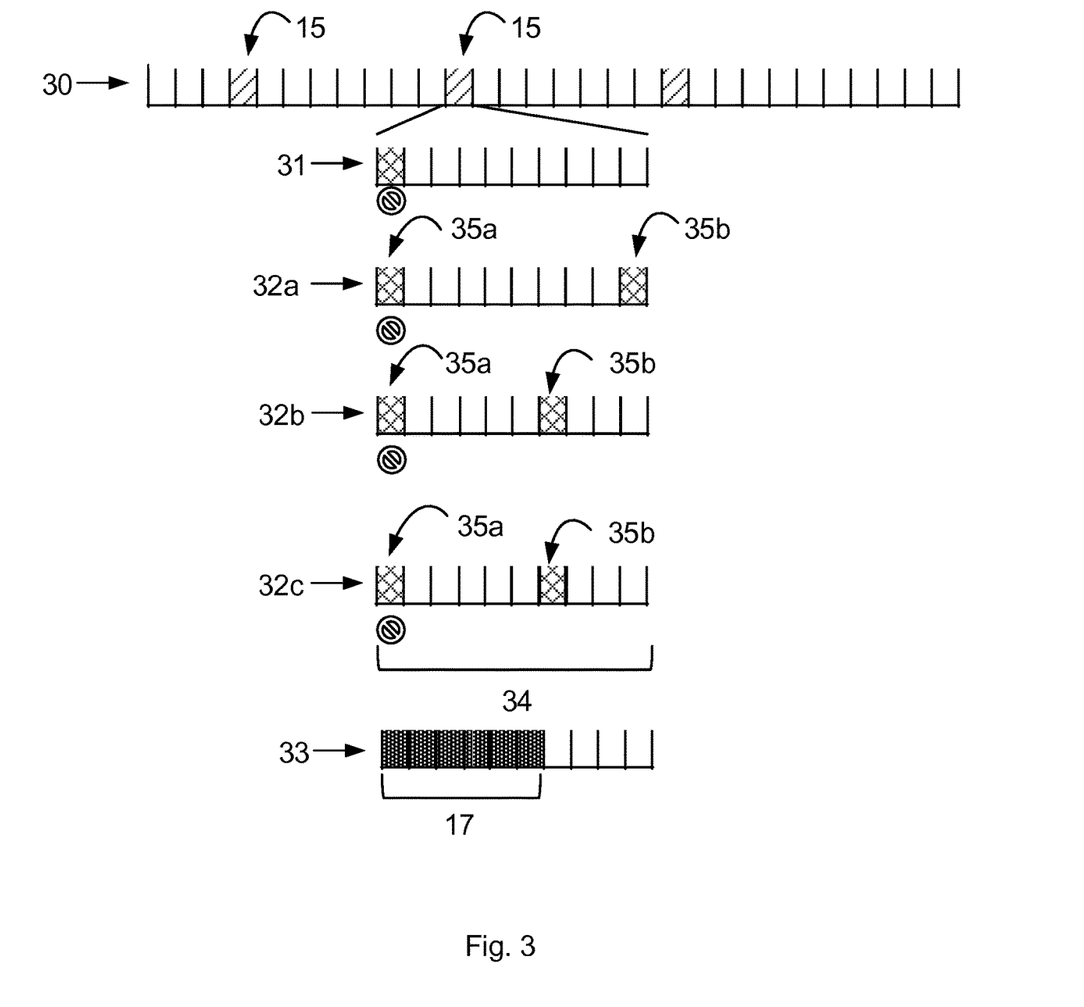
FIG. 3 illustrates an example of the present solution which makes sure that the PWS message is received.

The first line 30 of FIG. 3 illustrates SIB10 scheduling using paging and SIB information as discussed above. In this example SIB10 is scheduled every $80^{th}$ ms. The duration 34 of the system information (SI) window 15, where the SIB10 should be transmitted, is in this case 10 ms i.e. one LTE radio frame.

If the system information message is sent in the first subframe of the SI window, as shown at the second line from above 31, the message 35a will overlap with a measurement gap 17 starting in subframe #0 and having duration of 6 sub frames, as shown at 33.

If, however, a second system information message 35b is duplicated at e.g. subframe #9, the second instance 35b of the SI message will be received by the UE, because it does not overlap with the measurement gap 17. This is illustrated in line 32a The duplication may be done in any of the subframes of the LTE frame as shown on lines four 32b and five 32c from above in figure. In example 32b the duplicated messages are sent in subframes #0 and #6, and in example 32c the duplicated SI messages are sent in subframe #2 and #7.

Note that in FIG. 3, the SI message is a SIB10, but it might as well be any other suitable SIB; for example SIB11 or SIB12. In the Earthquake and Tsunami Warning System, ETWS, in Japan, the PWS message is submitted in SIB10 and SIB11. In the Commercial Mobile Alert Service, CMAS in North America, the PWS message is submitted in SIB12.

Figure 4:
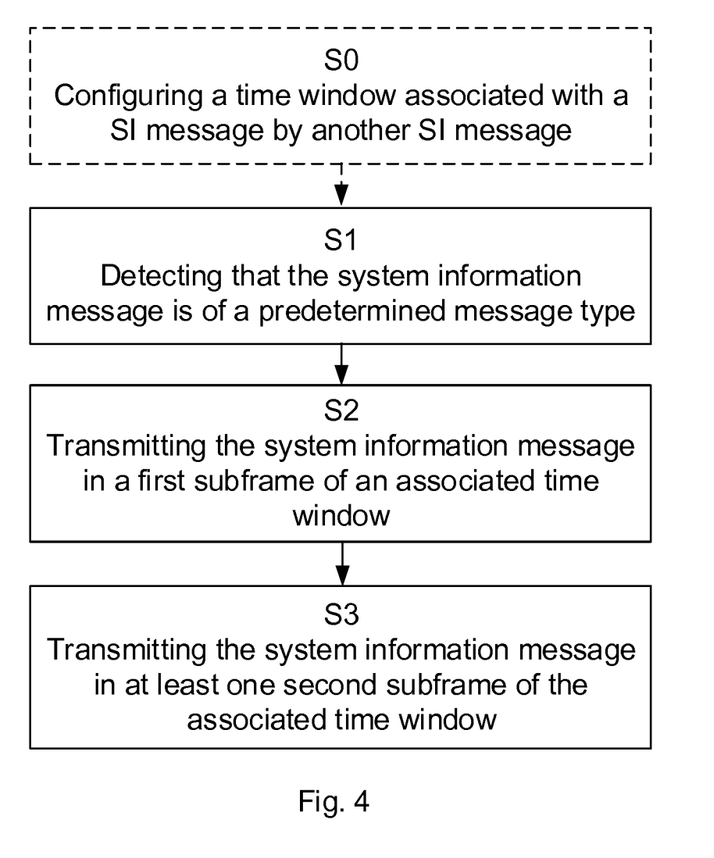
FIG. 4 is a flowchart illustrating embodiments of method steps in a network node.
Figure 5:
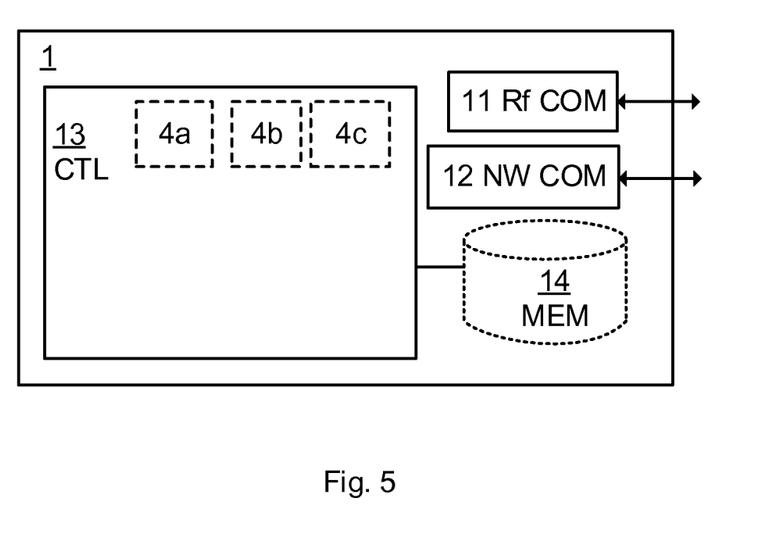
FIG. 5 illustrates an example node configuration of a network node, according to some of the disclosure.

The proposed technique will now be described referring to FIGS. 4 to 5. FIG. 4 illustrate example node operations of a network node. FIG. 5 illustrates example node configurations of said network node.

FIG. 5 illustrates an example network node 1, in a communication system, the network node being configured for detecting several messages of a preconfigured message type and for broadcasting a system information message 15 that is associated with a time window 34. The network node is typically a radio network node or base station, such as an eNodeB in LTE. The network node 1 comprises a radio communication interface 11, a network communication interface 12 configured for communication with other network nodes and processing circuitry 13.

The radio communication interface 11 is configured for communication with wireless devices within reach of the network node over a wireless communication technology.

The network communication interface 12 is configured for communication with other network nodes. This communication is often wired e.g. using fiber. However, it may as well be wireless. The connection between network nodes is generally referred to as the backhaul.

The controller, CTL, or processing circuitry 13 may be constituted by any suitable Central Processing Unit, CPU, microcontroller, Digital Signal Processor, DSP, etc. capable of executing computer program code. The computer program may be stored in a memory, MEM 14. The memory 14 can be any combination of a Read And write Memory, RAM, and a Read Only Memory, ROM. The memory 14 may also comprise persistent storage, which, for example, can be any single one or combination of magnetic memory, optical memory, or solid state memory or even remotely mounted memory.

The processing circuitry is configured to cause the network node 1 to detect that the system information, SI, message is of a predetermined message type, to transmit the system information message in a first subframe of the associated time window, and to transmit the system information message in at least one second subframe of the associated time window, in response to the detection S1 that the system information message is of a predetermined message type.

According to some aspects, the time window 34 is a radio frame or System Information (SI) time window. According to some aspects, the predetermined message type is a Public Warning System Message.

According to some aspects, the processing circuitry 13 is configured to cause the network node to configure the time window 34 by a system information message.

According to some aspects, a time delay between the first subframe (35a) and the second subframe 35b at least equals the time of a UE measurement gap 17.

According to some aspects, the time delay is at least 6 ms.

According to some aspects, the first subframe 35a is the first subframe #0 of a LTE radio frame or a SI window, and then the second subframe 35b is the last subframe #9 of a LTE radio frame or a SI window.

According to some aspects, the first subframe 35a is the first subframe #0 of a LTE radio frame or a SI window, and then the second subframe 35b is the 7th subframe #6 of a LTE radio frame or a SI window.

According to some aspects, the first subframe is any subframe # x of a LTE radio frame or a SI window and wherein the SI message is transmitted in a second subframe at least 6 ms later.

All those aspects will be further described in connection with the corresponding method of FIG. 4.

The proposed methods performed in a network node 1 will now be described in more detail referring to FIG. 4. In an initial step, the method, performed in the network node 1, for broadcasting a system information message 15 that is associated with a time window 34, comprises detecting, step S1, that the system information, SI, message is of a predetermined message type. According to some aspects the processing circuitry 13 comprises a detector 131 configured to detect that the SI message is of a predetermined message type. The detecting is for example done by reading the header information in the SI message. The predetermined message type is a message type that is considered to be of high importance for the UE. In other words, if it is considered that it is important that the UE receives the message. An example of a message of such high importance is a Public Warning System, PWS, message. PWS has been previously described in the background section and is a warning system that is used to warn the public about for example tsunamis or floods. In other words, according to some aspects, the predetermined message type is a Public Warning System Message. Thereby, the risk of a PWS message not reaching a UE is minimized.

The time window 34 is, according to some aspects, a system frame (LTE Frame) or System Information, SI, time window. As described above, the SI time window is the time window where a SI message, such as a PWS message, should be transmitted. According to some aspects, method comprises configuring the time window by another system information message. In other words, the time window has been configured by a previously transmitted system information message. Thus the time window has been previously determined. The time window is typically defined in System Information Block Type1, SIB1.

The method further comprises transmitting, step S2, the system information message in a first subframe 35a of the associated time window and transmitting, step S3, the system information message in at least one second subframe 35b of the associated time window 34, in response to the detection, step S1, that the system information message is of a predetermined message type. According to some aspects the processing circuitry 13 comprises a transmitter 132 configured to transmit the system information message in a first subframe and a transmitter 133 configured to transmit the system information message in at least a second subframe. The transmitters 132, 133 transmit via the radio communication interface 11. An example of transmitting the system information message in a first subframe and in a second subframe is illustrated in FIG. 3 described above.

According to some aspects, the system information message in the first subframe is copied to the at least one second subframe. According to some aspects, the system information message in the first subframe and the second subframe is substantially the same. The first and the at least one second subframes transmitting the SI messages are within in the same time window when a UE reads SI messages. In other words, the system information message will be sent at least two times within the same radio frame or SI time window to make sure that at least one of the messages does not coincide with a measurement gap. The measurement gap start at any subframe within a radio frame and has a specified length of for example 6 ms.

By performing the described method, the success rate for device reception of System Information is increased. The proposed method will increase the probability for the UE to receive essential broadcast information via System Information. Essential broadcast information includes for example PWS information. Specifically, the method will maximize the probability for PWS SIBs to be received in the UE, without re-scheduling and without affecting measurements gaps, by duplicating e.g. PWS SIB10/11/12 in two or more subframes within the same SI Window.

To make sure that the first subframe and the second subframe are not both coinciding with the measurement gap, a time delay between the first subframe 35a and the second subframe 35b, according to some aspects, at least equals the time of a UE measurement gap 17. In other words, it is ensured that at least one of the first and the second subframe is received at the UE when there is no measurement gap.

According to some aspects, the time delay is at least 6 ms. 6 ms then being the length of the measurement gap. If the length of the measurement gap is longer, the time delay will be as long.

There are several possible ways to locate the second subframe to make sure that at least one of the subframes reached the UE. According to some aspects, when the first subframe 35a is the first subframe #0 of a LTE radio frame or a SI window, then the second subframe 35b is the last subframe #9 of a LTE radio frame or a SI window. This is the case that is shown in FIG. 3. The time window is 10 ms long, divided into 10 subframes, from #0 to #9. The LTE radio frame and the SI window is the previously discussed time window. It is thus ensured that the measurement gap does not coincide with both the first and the second subframe since the length of the measurement gap is only 6 ms and the first and the second subframe has 8 ms between them.

Another example of how to locate the first and the second subframe is, according to some aspects, when the first subframe 35a is the first subframe #0 of a LTE radio frame or a SI window, and then the second subframe 35b is the 7th subframe #6 of a LTE radio frame or a SI window. 5 subframes is the minimum number of subframes that need to separate the first and the second subframe to ensure that at least one of the subframes is received at the UE when the time gap is 6 ms. Of course, should the measurement gap be for example 5 ms, there need to be at least 6 subframes separating the first and the second subframe. According to some aspects, the first subframe is any subframe # x of a LTE radio frame or a SI window and wherein the SI message is transmitted in a second subframe at least 6 ms later. It is possible to place the first subframe and the second subframe anywhere in the LTE radio frame or SI window as long as the second subframe is at least 6 ms later, taken from the start of the first subframe. In other words, the second subframe is transmitted at least the time duration of the measurement gap later than the beginning of the first subframe. Note that a measurement cap may start at any subframe within a time window. If it was known exactly when the measurement gap would occur it would be enough to schedule the first subframe around it so that they do not coincide.

The example is based on an SI time window of 10 ms and 80 ms periodicity of SIB10 for easy readability but is of course applicable to other set-ups as well.

According to some aspects, the disclosure relates to computer program code which, when executed, causes a radio network node to execute the method according to above and with the same advantages as previously discussed when discussing the method.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that although terminology from 3GPP LTE has been used herein to explain the example embodiments, this should not be seen as limiting the scope of the example embodiments to only the aforementioned system. Other wireless systems, including WCDMA, WiMax, UMB and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the embodiments, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory, ROM, Random Access Memory, RAM, compact discs, CDs, digital versatile discs, DVD, etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following embodiments.

The invention claimed is:

1. A method, performed in a network node, for broadcasting a system information message that is associated with a time window, the method comprising:
   detecting that the system information message is of a predetermined message type,
   transmitting the system information message in a first subframe of the associated time window, and
   transmitting a duplicate of the system information message in at least one second subframe of the associated time window, in response to the detection that the system information message is of a predetermined message type, wherein a time delay between the first subframe and the second subframe is at least the time of a UE measurement gap.

2. The method of claim 1, wherein the time window is a radio frame.

3. The method of claim 1, wherein the method comprises:
   configuring the time window by another system information message.

4. The method of claim 1, wherein the predetermined message type is a Public Warning System Message.

5. The method of claim 1, wherein the time delay is at least 6 milliseconds.

6. The method of claim 1, wherein when the first subframe is the first subframe (#0) of a LTE radio frame or a System Information window, then the second subframe is the last subframe (#9) of a LTE radio frame or a System Information window.

7. The method of claim 1, wherein when the first subframe is the first subframe (#0) of a LTE radio frame or a System Information window, then the second subframe is the 7th subframe (#6) of a LTE radio frame or a System Information window.

8. The method of claim 1, wherein the first subframe is any subframe (# x) of a LTE radio frame or a System Information window and wherein the System Information message is transmitted in a second subframe at least 6 milliseconds later.

9. The method of claim 1, wherein the time window is a System Information time window.

10. A non-transitory computer-readable medium comprising, stored thereupon, a computer program comprising computer program code configured for execution by a processor in a radio network node so as to cause the radio network node to:
    detect that the system information message is of a predetermined message type,
    transmit the system information message in a first subframe of the associated time window, and
    transmit a duplicate of the system information message in at least one second subframe of the associated time window, in response to the detection that the system information message is of a predetermined message type wherein a time delay between the first subframe and the second subframe is at least the time of a UE measurement gap.

11. A network node, in a communication system, the network node being configured to broadcast a system information message that is associated with a time window, the network node comprising:
 a radio communication interface;
 a network communication interface configured for communication with other network nodes, and
 processing circuitry configured to cause the network node to:
  detect that the system information message is of a predetermined message type,
  transmit the system information message in a first subframe of the associated time window, and
  transmit a duplicate of the system information message in at least one second subframe of the associated time window, in response to the detection that the system information message is of a predetermined message type, wherein a time delay between the first subframe and the second subframe is at least the time of a UE measurement gap.

12. The network node of claim 11, wherein the time window is a radio frame or System Information time window.

13. The network node of claim 11, wherein the processing circuitry is configured to cause the network node to
 to configure the time window by a system information message.

14. The network node of claim 11, wherein the predetermined message type is a Public Warning System Message.

15. The network node of claim 11, wherein the time delay is at least 6 milliseconds.

16. The network node of claim 11, wherein when the first subframe is the first subframe (#0) of a LTE radio frame or a System Information window, then the second subframe is the last subframe (#9) of a LTE radio frame or a System Information window.

17. The network node of claim 11, wherein when the first subframe is the first subframe (#0) of a LTE radio frame or a System Information window, then the second subframe is the 7th subframe (#6) of a LTE radio frame or a System Information window.

18. The network node of claim 11, wherein the first subframe is any subframe (# x) of a LTE radio frame or a System Information window and wherein the System Information message is transmitted in a second subframe at least 6 milliseconds later.

* * * * *

UNITED STATES PATENT AND TRADEMARK OFFICE
CERTIFICATE OF CORRECTION

| | |
|---|---|
| PATENT NO. | : 10,609,539 B2 |
| APPLICATION NO. | : 15/754498 |
| DATED | : March 31, 2020 |
| INVENTOR(S) | : Henrik Jeppsson |

Page 1 of 1

It is certified that error appears in the above-identified patent and that said Letters Patent is hereby corrected as shown below:

In Column 6, Line 17, delete "RAM," and insert -- RWM, --, therefor.

In Column 12, Line 3, in Claim 13, delete "to configure" and insert -- configure --, therefor.

Signed and Sealed this
Twenty-second Day of September, 2020

Andrei Iancu
*Director of the United States Patent and Trademark Office*